(12) United States Patent
Tobon-Mejia

(10) Patent No.: US 11,493,404 B2
(45) Date of Patent: Nov. 8, 2022

(54) METHOD AND SYSTEM FOR ESTIMATING THE WEAR OF A ROTATING MACHINE INCLUDING A BEARING

(71) Applicant: ALSTOM Transport Technologies, Saint-Ouen-sur-Seine (FR)

(72) Inventor: Diego Alejandro Tobon-Mejia, Paris (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 118 days.

(21) Appl. No.: 17/076,683

(22) Filed: Oct. 21, 2020

(65) Prior Publication Data

US 2021/0123833 A1  Apr. 29, 2021

(30) Foreign Application Priority Data

Oct. 23, 2019  (FR) ...................................... 1911866

(51) Int. Cl.
  *G01M 13/045*  (2019.01)
  *G01H 1/00*  (2006.01)

(52) U.S. Cl.
  CPC .......... *G01M 13/045* (2013.01); *G01H 1/003* (2013.01)

(58) Field of Classification Search
  CPC .............................. G01M 13/045; G01H 1/003
  See application file for complete search history.

(56) References Cited

U.S. PATENT DOCUMENTS

| 2013/0116937 A1* | 5/2013 | Calhoun | G01M 13/028 702/35 |
| 2017/0315516 A1* | 11/2017 | Kozionov | G01M 13/045 |
| 2018/0298744 A1* | 10/2018 | Ebrahimi | E21B 47/009 |
| 2020/0333214 A1* | 10/2020 | Katou | G01M 13/045 |

FOREIGN PATENT DOCUMENTS

| CA | 2707519 A1 * | 5/2009 | ............ G01M 13/04 |
| EP | 3260836 A1 | 12/2017 | |

(Continued)

OTHER PUBLICATIONS

INPI Rapport de Recherche Preliminaire for Patent Application No. FR 1911866, Jun. 17, 2020, 2 pp.

(Continued)

*Primary Examiner* — Natalie Huls
*Assistant Examiner* — Cynthia L Davis
(74) *Attorney, Agent, or Firm* — Soquel Group LLC

(57) ABSTRACT

A method including measuring vibrations of a rotating machine during its operation, using a vibration sensor. Next, from the signal measured by the sensor, automatically extracting, using an electronic detection device, a first signal representative of components of a first frequency range of the measured vibration signal, and a second signal representative of a second frequency range of the measured vibration signal. Then, from the first signal, calculating a first data set belonging to a time domain of the first signal, and extracting first calculation elements therefrom. Next, from the second signal, calculating a second data set belonging to a frequency domain of the second signal, and extracting second calculation elements therefrom. Lastly, determining a health index of the bearing from each of the extracted calculation elements.

10 Claims, 4 Drawing Sheets

(56) References Cited

FOREIGN PATENT DOCUMENTS

WO     2002073150 A2     9/2002
WO     2009138106 A1     11/2009

OTHER PUBLICATIONS

Gupta et al., "Fault Detection Analysis in Rolling Element Bearing: A Review," Materials Today: Proceedings, vol. 4, No. 2, Jan. 2, 2017, pp. 2085-2094.

Ibnu et al., "Detection of Rolling Element Bearing Defects by Vibration Signature Analysis: A Review," 2014 Annual International Coference on Emerging Research Areas: Magnetics, Machines and Drives, IEEE, Jul. 24, 2014, pp. 1-5.

\* cited by examiner

METHOD AND SYSTEM FOR ESTIMATING THE WEAR OF A ROTATING MACHINE INCLUDING A BEARING

CROSS-REFERENCE TO RELATED APPLICATIONS

This application claims priority of French Patent Application No. 19 11866, filed on Oct. 23, 2019.

FIELD OF THE INVENTION

The present invention relates to a method for estimating the wear of a rotating machine including a bearing. The present invention also relates to a mechanical system including a rotating machine including at least one bearing, as well as an electronic detection device provided to implement this method.

The present invention relates to the field of detecting failures and predictive maintenance, particularly applied to bearings placed on rotating machines.

BACKGROUND OF THE INVENTION

Rotating machines, for example electric motors, can be provided with bearings, such as ball bearings or roller bearings, which ensure the relative rotational movement between two parts of said machines. However, the bearings have a limited lifetime, in particular due to the vibrations caused by the movements of the machine.

When a bearing reaches the end of its life, it gives way, which may cause problems, such as the breaking of parts of the machine and operator injuries. It is therefore necessary to inspect the health of the bearings throughout the entirety of their operation so as to know when to stop the machine and preventively change the bearing in order to avoid breaking of the bearing.

EP-2,365,310-B1 provides a method and a system for detecting damage to the ball bearing once it appears. To this end, a first particle sensor is positioned in the system in order to estimate the amount of debris ejected by the defective bearing into the oil. The sensor stores the information so as to record the quantity of particles ejected over time. Thus, first condition indicators based on the debris present in the oil of the bearing can be determined. These first indicators are supplemented by second indicators based on the vibrations of the bearing.

However, this solution does not make it possible to have a reliable evaluation of the health of the bearing. Furthermore, the calculated indicators are not always easy to use and analyze.

The invention more particularly aims to address these drawbacks by proposing an improved method and system for detecting the wear of a bearing associated with a rotating machine.

SUMMARY OF THE DESCRIPTION

To that end, the invention relates to a method including steps consisting of, first, in a step a), measuring the vibrations of the rotating machine during its operation, using a vibration sensor. In a step b), a first signal representative of components of a first frequency range of the measured vibration signal and a second signal representative of a second frequency range of the measured vibration signal are extracted automatically from the signal measured by said sensor using an electronic detection device. Next, in a step c), a first data set belonging to a time domain of the first signal is calculated from a first signal, and first calculation elements are extracted therefrom. Then, in a step d), from the second signal, a second data set belonging to a frequency domain of the second signal is calculated and second calculation elements are extracted therefrom. Lastly, in a step e), a health index of the bearing is determined from each of the extracted calculation elements.

Owing to the invention, the dissociation of the measured signal as a function of the frequencies makes it possible to isolate the frequencies that are useful for the calculation of the first data set, relative to the time domain, and the frequencies that are useful for the calculation of the second data set, relative to the frequency domain. This makes it possible to calculate a health index that can be used more easily and more usefully for predictive maintenance.

According to advantageous but optional aspects of the invention, such a method may incorporate one or more of the following features, considered in any technically allowable combination:

- The first range is the range [10 Hz, 1 kHz] and the second range is the range [10 Hz, 10 kHz].
- The measured signal is an acceleration signal representative of the measured vibrations, the first data set includes a velocity of the measured vibrations and the second data set includes the envelope of a spectrum of the acceleration of the measured signal.
- The first calculation elements include at least one element, chosen from the following elements: a root mean square of the first data set, a root mean square of the measured signal; and the second calculation elements include at least one root mean square of harmonics of the second data set associated with a predefined failure frequency of the bearing.
- Step e) includes an extrapolation, including the calculation of at least one future value of the health index from at least part of the health index as previously calculated, and the estimate of the remaining lifetime of the bearing by comparing said at least one future value of the health index to at least one predefined limit.
- The method includes emitting an alert via the detection device if the health index exceeds one of said predefined limit values.
- During step e), a statistical distance relative to a reference data set is calculated for each of the extracted calculation elements.
- The statistical distance is a distance separating the calculation elements extracted from the reference data set, in particular a Mahalanobis distance.
- Steps a) to e) are implemented periodically with a predefined periodicity.

The invention also relates to a mechanical system including a rotating machine, including a shaft and at least one bearing mounted on this shaft, a vibration sensor in order to measure the vibrations of the rotating machine and an electronic detection device in order to detect a bearing defect. The electronic detection device is programmed in order to, in a step a), measure the vibrations of the rotating machine during its operation, using the vibration sensor. In a step b), a first signal representative of components of a first frequency range of the measured vibration signal and a second signal representative of a second frequency range of the measured vibration signal are extracted automatically from the signal measured by said sensor. Next, in a step c), a first data set belonging to a time domain of the first signal is calculated from a first signal, and first calculation elements are extracted therefrom. Then, in a step d) a second data set belonging to a frequency domain of the second signal is calculated from the second signal and second calculation elements are extracted therefrom. Lastly, in a step e), a health index of the bearing is determined from each of the extracted calculation elements.

BRIEF DESCRIPTION OF THE DRAWINGS

The invention will be better understood, and other advantages thereof will appear more clearly, in light of the following description of a method for estimating the wear of a rotating machine including at least one bearing and a mechanical system including an electronic detection device provided to implement this method in order to estimate the wear of a rotating machine including a bearing, done in reference to the drawings, in which.

DETAILED DESCRIPTION

Figure 1:
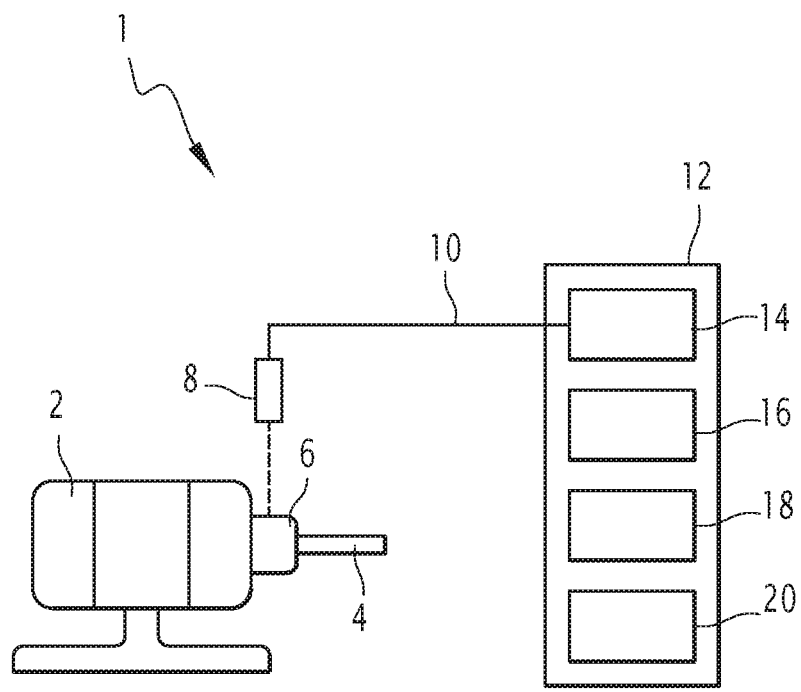
FIG. 1 is a schematic view of a mechanical system including a rotating machine, including bearings, the mechanical system also including an electronic device for detecting a defect according to one embodiment of the invention.

FIG. 1 schematically shows a mechanical system 1 according to the invention.

Mechanical system 1 includes a rotating machine 2, including a shaft 4, on which a bearing 6 is mounted.

For example, rotating machine 2 is an electric motor, such as a railway traction motor, and bearing 6 is a ball bearing or a roller bearing or a needle bearing.

In general, mechanical system 1 may include several bearings 6; for example, two or five bearings.

In a variant, rotating machine 2 may be other than an electric motor. It may be a compressor or a pump, for example, within an air conditioning system or a hydraulic circuit.

The bearings, in particular the ball bearings, have a limited lifetime and play a key role in the proper working of mechanical system 1 to which they belong. Thus, when a bearing breaks, it puts the entire structure of mechanical system 1 in danger. It is therefore necessary to inspect the health of bearing 6 so as to be able, in case of excessive wear of the bearing 6, to change it in appropriate time frames.

To this end, mechanical system 1 also includes an electronic detection device 12 for preventively detecting a defect of bearing 6.

According to embodiments, the detection system includes a sensor 8, intended to measure vibrations of rotating machine 2 and of bearing 6.

Sensor 8 is an accelerometer connected to electronic detection device 12 by a data link 10. Sensor 8 is, for example, associated with bearing 6.

In a variant, sensor 8 includes any type of device suitable for vibration measurement, for example, a strain gauge or a laser movement sensor.

In the illustrated example, electronic detection device 12 includes a data acquisition module 14, connected to sensor 8 by means of data link 10, a processor 16, a memory 18 and a communication interface 20.

Data acquisition module 14 is programmed to collect data from sensor 8 regarding vibrations of bearing 6. Data acquisition module 14 may include, for example, a signal conditioning circuit or an analog-digital converter, or any other similar electronic equipment.

Processor 16 may be, for example, a programmable microcontroller, a microprocessor, or any similar equipment.

Memory 18 may include a read-only memory (ROM) and/or a random-access memory (RAM), and/or a non-volatile memory, such as a flash memory, a magnetic memory, or a phase change memory, or any appropriate memory technology.

Communication interface 20 may include a display screen, or a keyboard, or, for example, a touch-sensitive screen allowing the user of mechanical system 1 to enter data into the interface, to give orders to mechanical system 1, and to receive information about operation of mechanical system 1.

Figure 2:
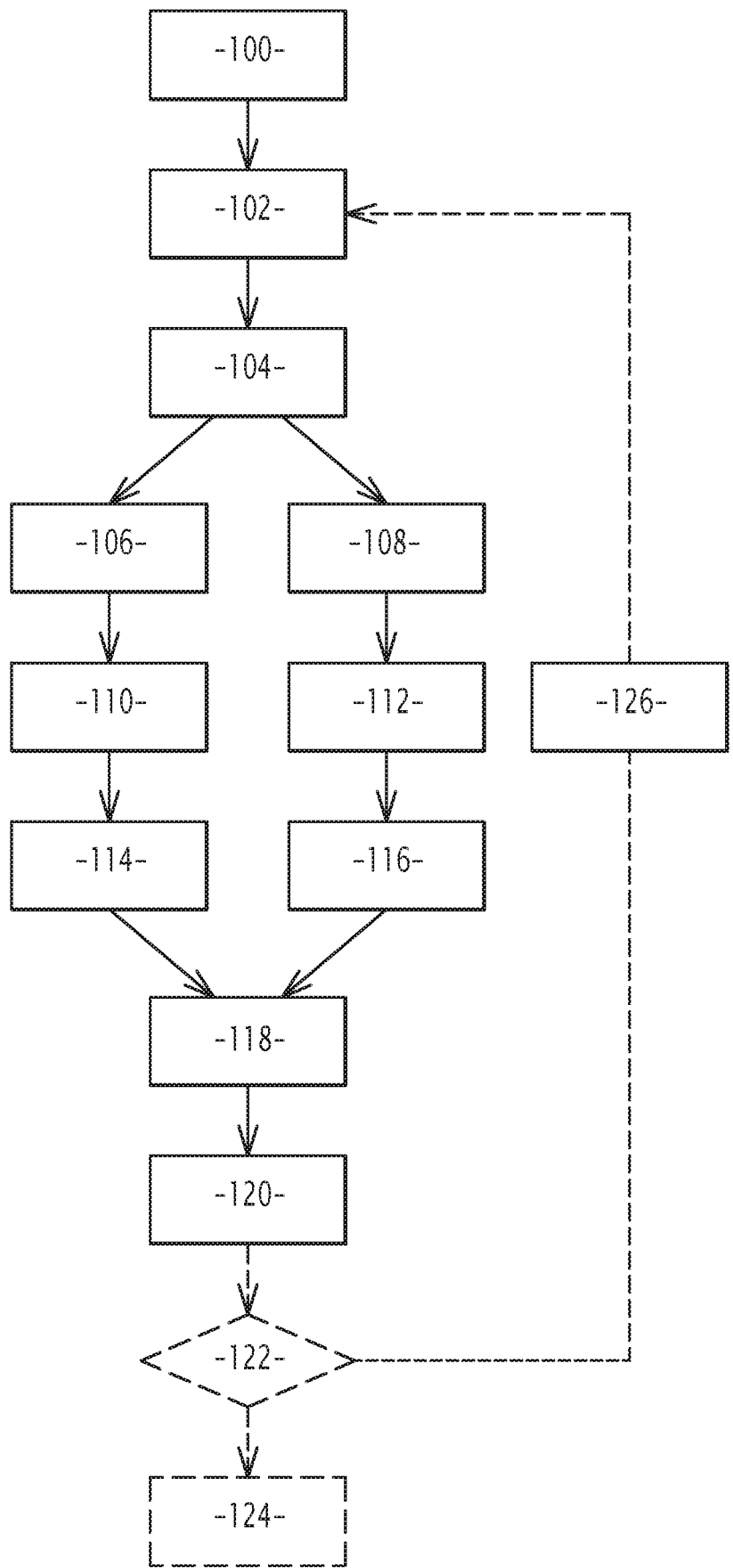
FIG. 2 is a diagram of a method for estimating the wear of the rotating machine and of the bearing of FIG. 1.

FIG. 2 shows an example of a method implemented by electronic detection device 12, during operation of mechanical system 1, in order to detect wear of rotating machine 2 and of bearing 6.

First, at first step 100, mechanical system 1 is turned on, for example, by an operator, using an actuating device not shown in the figures, which can be a button or a command of electronic detection device 12 entered into communication interface 20.

Then, at step 102, sensor 8 acquires raw data regarding vibrations of rotating machine 2 and of bearing 6.

According to preferred embodiments, sensor 8 acquires data periodically, according to a period predefined by the user. In the notation used hereinafter, "N" designates the number of data samples acquired during operation of system 1 and "i" designates an index identifying one of these samples.

In a variant, sensor 8 may acquire data continuously.

The raw data acquired at step 102 are acceleration data A(i) located in a frequency domain.

Next, at optional step 104, the raw data acquired at step 102 are pre-processed and filtered.

The filtering consists of extracting useful data to detect defects of the bearings. This makes it possible to limit the quantity of data to be processed in the following steps, and therefore to lighten and accelerate processing of the data.

Next, the signal is separated into two signals belonging to two different domains.

Among these signals, a first signal is representative of accelerations A(i) associated with frequencies in a first frequency range, for example, the range [10 Hz, 1 kHz]. This signal is extracted at step 106.

A second signal is representative of accelerations A(i) associated with frequencies in a second frequency range, for example, the range [10 Hz, 10 kHz]. This signal is extracted at step 108.

In a variant, the bounds of the first and second frequency ranges may be chosen differently. For example, according to one variant, the first frequency range may be the range [0 Hz, 1 kHz], and the second frequency range may be the range [1 kHz, 10 kHz].

At step 110, using electronic detection device 12, the first signal is processed so as to automatically extract, from the signal measured by sensor 8, a first data set of the time domain.

According to examples, an optional pre-processing sub-step is performed on the first signal, during which frequencies below 10 Hz of the first frequency range are eliminated, and the signal is centered on the frequency around which the first interval is centered.

Then a first arithmetic integration in the frequency domain is performed on the signal thus conditioned, which is advantageously a sine curve.

The first arithmetic integration may be done, for example, using different methods and known algorithms, such as the Poncelet method or the Omega algorithm.

A second integration is next performed in the time domain in order to obtain the first data set, which, in this example, includes vibration speeds of bearing 6. The second arithmetic integration may be performed using different methods and known algorithms, such as the Poncelet method or the Omega algorithm.

The speeds, i.e., the velocities, of the measured vibrations form the first data set.

The vibration speeds at relatively low frequency are interesting because they are a direct fatigue indicator, given that they account for both movement and frequency, and it is therefore not necessary to know the vibration frequency in order to perform the calculations necessary to evaluate the health state of rotating machine 2 and of bearing 6. Furthermore, measurement of the overall vibrations is a good indicator of the overall health state of the system 1.

In parallel, the second signal is processed, at step 112, so as to extract, from the measured acceleration signal A(i), a second data set in the frequency domain.

In practice, the defects of the bearings follow a cyclostationary law. Mathematically, a signal is said to be cyclostationary if there is a periodicity, which may be called a cycle, in some of its statistical properties, for example, in its mean or in its variance. A rotating machine is said to be cyclostationary if its operating parameters, such as the mean speed or the cycle time of the motor, are constant throughout operation of the machine.

For example, processing of the second signal implemented at step 112 includes a cyclostationary analysis, where the cyclic coherence of the spectrum of the second signal is analyzed. Two sinusoidal signals are said to be coherent if they have the same frequency and have a constant phase shift. In the case of a cyclostationary signal, the spectrum of a signal is cyclically coherent if the different cycles of the signal have a same frequency and a constant phase shift.

The result of the cyclostationary analysis is an envelope $A_e$ of the measured acceleration signal of the second frequency range in the frequency domain.

Next, an improved spectrum of the envelope $A_e$, defined owing to the cyclostationary analysis, is determined. To do this, for each frequency, each harmonic is averaged with its side bands in order to have a better readability. The spectrum of the envelope $A_e$ of the acceleration A(i) of the measured signal forms the second data set.

This relatively high frequency data processing makes it possible to locate the energy contribution of vibration due to bearing defects.

These two data sets thus created are next used at steps 114 and 116 to extract first calculation elements and second calculation elements.

The first calculation elements of step 114 include a root mean square $\overline{V_{RMS}}$ of the first data set, defined by the following function:

$$\overline{V_{RMS}} = \sqrt{\frac{\sum_{i=1}^{N} V(i)^2}{N}},$$

where N is the total number of measurements taken by sensor 8, i is an index representing one of these measurements, and V(i) is the speed of the $i^{th}$ sample recorded by sensor 8.

The second calculation elements of step 116 include a harmonic root mean square $\overline{A_{RMS}}^F$ of the second data set, defined by the following function:

$$\overline{A}_{RMS}^F = \sum_{h=1}^{H} \frac{(\max([A_e(F_h + S), A_e(F_h - S)]))^2}{H},$$

where max( ) is the maximum function, H is the total number of harmonics, h represents one of the H harmonics, $F_h$ is the characteristic defect frequency of the different elements of bearing 6, and S is a sliding coefficient of bearing 6. Frequency $F_h$ takes values from a set [BPFO, BPFI, BSF, FTF], where BPFO is the output frequency of a ball of bearing 6 by its outer ring, BPFI is the output frequency of a ball of bearing 6 by its inner ring, BSF is the frequency of rotation of the balls, and FTF is a fundamental train frequency.

The second calculation elements therefore include a set of harmonic root mean squares from the second data set. The harmonics of each mean are associated with a predefined failure frequency of bearing 6. For example, the harmonics each correspond to a multiple of a fundamental frequency corresponding to a predefined failure frequency.

The set of root mean squares is denoted $A_M$, and corresponds to the set of frequencies for which a defect of bearing 6 is observed. The vector $A_M$ is outlined in the formula below:

$$\overrightarrow{A_M} = \begin{bmatrix} \overline{A}_{RMS}^{BPFO} \\ \overline{A}_{RMS}^{BPFI} \\ \overline{A}_{RMS}^{BSF} \\ \overline{A}_{RMS}^{FTF} \end{bmatrix}$$

The measured acceleration A(i) is used to establish calculation elements that include a root mean square $\overline{A_{RMS}}$ of the measured accelerations, for example, given by the following formula:

$$\overline{A_{RMS}} = \sqrt{\frac{\sum_{i=1}^{N} A(i)^2}{N}}.$$

Then, at step 118, the calculation elements of steps 114 and 116 are merged and, optionally, a weight is assigned to one or several of these elements in order to create an element vector $F_e$, as defined in the formula below:

$$\vec{F_e} = \vec{\alpha} \begin{bmatrix} \overline{V_{RMS}} \\ \overline{A_{RMS}} \\ A_M \end{bmatrix} = \begin{bmatrix} \alpha_1 \overline{V_{RMS}} \\ \alpha_2 \overline{A_{RMS}} \\ \alpha_3 \overline{A_{RMS}^{BPFO}} \\ \alpha_4 \overline{A_{RMS}^{BPFI}} \\ \alpha_5 \overline{A_{RMS}^{BSF}} \\ \alpha_6 \overline{A_{RMS}^{FTF}} \end{bmatrix}$$

where a is a weight vector with weights $a_1$, $a_2$, $a_3$, $a_4$, $a_5$ and $a_6$ associated with the different elements of $F_e$. One or several of these weights may be equal to 1.

In a variant, merging of the calculation elements in vector $F_e$ does not use a weight vector; the vector thus corresponds to the formula below.

$$\vec{F_e} = \begin{bmatrix} \overline{V_{RMS}} \\ \overline{A_{RMS}} \\ A_M \end{bmatrix} = \begin{bmatrix} \overline{V_{RMS}} \\ \overline{A_{RMS}} \\ \overline{A_{RMS}^{BPFO}} \\ \overline{A_{RMS}^{BPFI}} \\ \overline{A_{RMS}^{BSF}} \\ \overline{A_{RMS}^{FTF}} \end{bmatrix}$$

The components of this vector $F_e$ of merged elements are used at step 120 in order to calculate a health index of the bearing, denoted "IS". Health index IS is determined by calculating, from each of the extracted calculation elements, a statistical distance relative to a reference data set. In other words, the measured data are compared to reference data.

In the illustrated example, the statistical distance is a Mahalanobis distance, defined by the following function:

$$IS = D^2(\vec{F_e}) = (\vec{F_e} - \vec{\mu})^T S^{-1} (\vec{F_e} - \vec{\mu}).$$

where $S^{-1}$ is a covariance matrix and $\mu$ is a vector of the mean of the reference data.

In a variant, the statistical distance may be a distance of least squares or any other appropriate statistical distance.

Advantageously, health index IS may be used to predict a future failure of bearing 6, for example, by extrapolating future values of health index IS from past values of health index IS.

For example, at step 122, health index IS is compared to one or several limits defined beforehand by a user.

The method described above, from step 102 to step 122, is repeated periodically, according to a periodicity defined by the user, for example, with the same periodicity as that used to acquire data with sensor 8. The method is repeated as long as rotating machine 2 is operating.

In a variant, the method may be implemented periodically, on demand by the user.

If the health index is above one of the limits of step 122, then at step 124, an alert is provided to the user by means of the communication interface.

For example, a first limit may be an input limit in a vigilance zone, which only induces an alert for the user by means of the communication interface 20. A second alert may be, for example, a danger zone entry limit, which induces stopping of mechanical system 1.

Conversely, if the health index does not exceed one of these limits, at step 126, the values calculated from the signal measured by sensor 8 are used to extrapolate the evolution of the health index over time, by calculating at least one future value of health index IS from at least some of the previously-calculated health indices IS, and thus to determine the remaining lifetime of bearing 6. This information is next provided to the operator, for example, by displaying a message on communication interface 20, or by sending a message to a remote apparatus via communication interface 20. The method next returns to step 102. Extrapolation of the evolution of health index IS is explained in more detail below.

Figure 3:
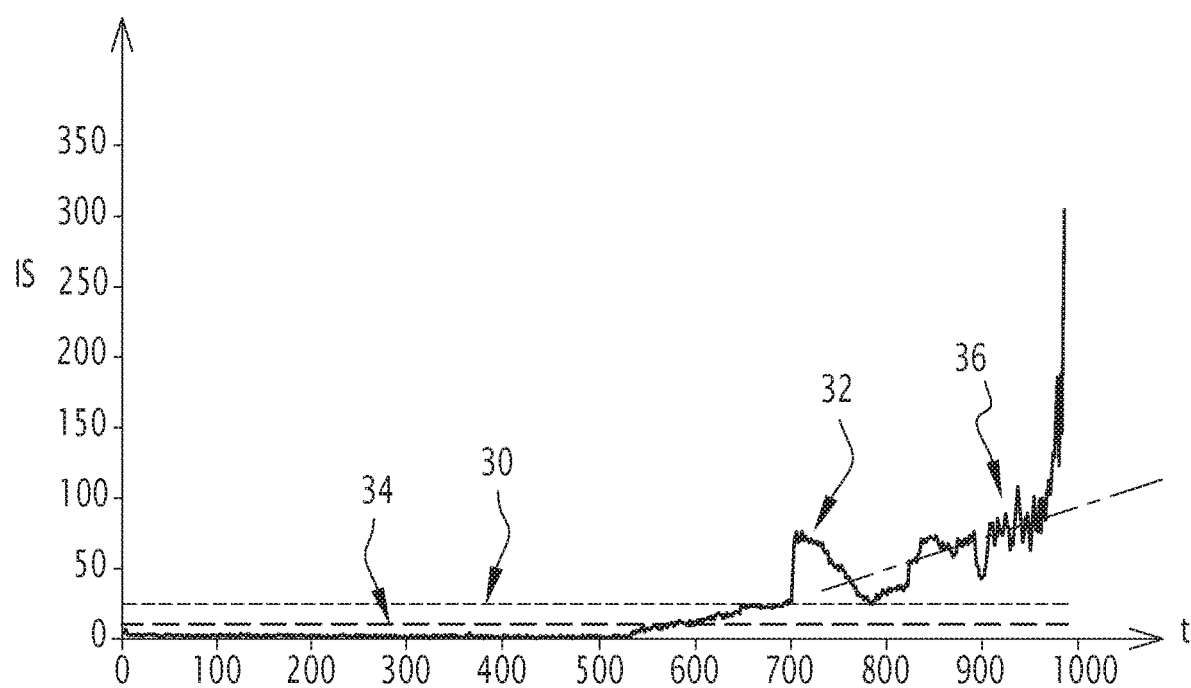
FIG. 3 is a graph showing an example of the evolution of a health index of the bearing as a function of time, calculated using the method of FIG. 2.

FIG. 3 shows an example of the evolution as a function of time (denoted "t" on the x-axis) of health index IS (arbitrary value, on the y-axis) calculated at step 120 for bearing 6 using the method previously described. This evolution is illustrated in the figure by a curve 32. The graph shows, as an example, two predefined limits: a first fault limit 30 and a second alarm limit 34.

The time used to describe this figure is arbitrarily noted in measurement instants, each measurement instant corresponding to a data recording or sampling by sensor 8 and/or by data acquisition module 14. In other words, each measurement instant corresponds to a measurement point.

The recordings are done at regular intervals, for example periodically. The interval between two consecutive measurements is chosen, for example, to be equal to ten minutes.

In the illustrated example, instant 1 corresponds to the instant of the first recording. The following instant 2 corresponds to the subsequent recording performed ten minutes later. Likewise, instant 8 in this example corresponds to a recording performed 70 minutes after the first recording.

As may be seen, up to about instant 533, health index IS stays close to 0. This means that bearing 6 is in good health, and that there is no risk of using it. Next, health index IS begins to increase. This means that bearing 6 begins to degrade.

At instant 700, there is a strong degradation of health index IS, for example, following a first mechanical failure. This failure may be a loss of material, for example, a loss of balls, a mechanical impact on the bearing, or a contamination of the surfaces of the bearings by an outside substance.

This may be found on curve 32. Indeed, variations after instant 800, identified by reference 36, follow a relatively stable curve that, in this example, has a quasi-linear tendency; i.e., there are no divergences and the overall evolution of the curve is relatively monotonic.

FIG. 3 shows that health index IS, thus calculated, respects theoretical conditions to be useful in the context of a failure prognosis for predictive maintenance.

The first of these theoretical conditions is good monotony, that is to say a relatively stable evolution.

According to the second of these conditions, it must be possible to easily read and use and understand a tendency of the curve, which must therefore be easy to extrapolate. Here, this tendency is linear.

Figure 4:
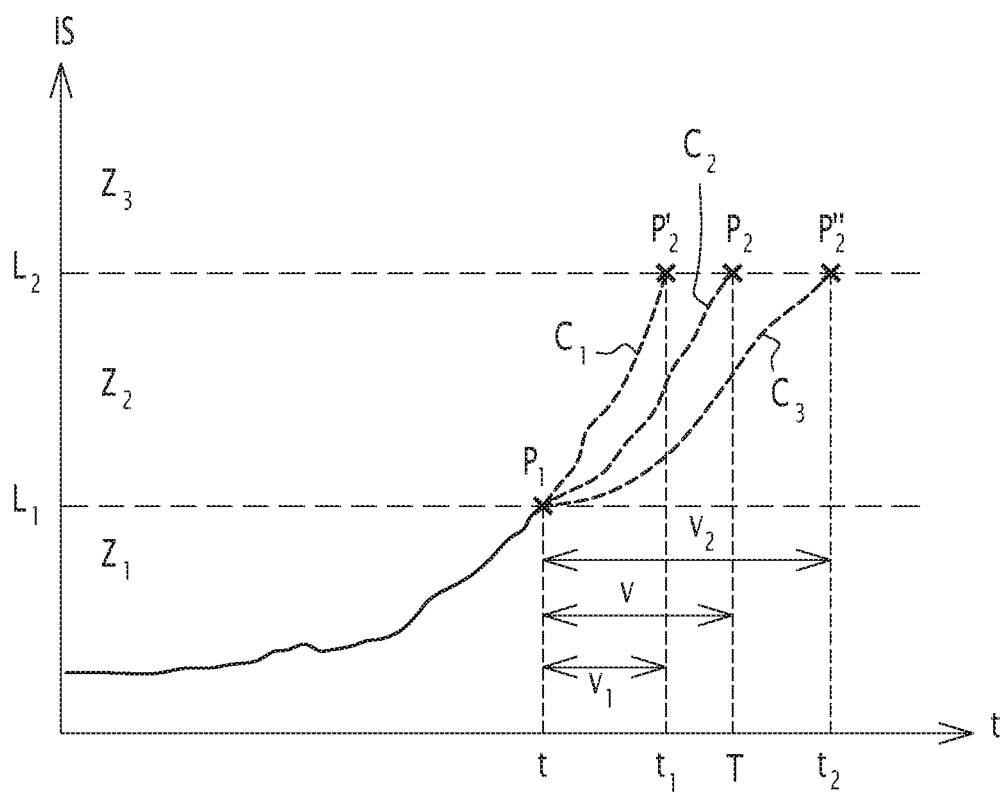
FIG. 4 is a graph showing an example of an extrapolation of the health index, calculated using the method of FIG. 2, of the bearing as a function of time.

FIG. 4 shows the result of step 126 for extrapolation of FIG. 2.

In this example, the x-axis shows the time, denoted "t", and the y-axis shows the health index, denoted "IS". Three zones are defined in this graph. A first zone, denoted "$Z_1$", corresponds to values of health index IS that are less than or equal to a first limit $L_1$, referred to as a "vigilance threshold". First zone $Z_1$, for example, corresponds to a normal operating zone.

A second zone, denoted "$Z_2$", corresponds to values of health index IS that are greater than vigilance threshold $L_1$ and less than or equal to a second limit $L_2$, referred to as a "danger threshold". Second zone $Z_2$, for example, corresponds to a vigilance zone, i.e., a zone in which it is necessary to pay great attention to the health state of bearing 6.

A third zone, denoted "$Z_3$", corresponds to values of health index IS that are greater than danger threshold $L_2$. Third zone $Z_3$ corresponds to a danger zone, i.e., there are high risks of bearing 6 breaking when it arrives in this zone.

The curve located between 0 and t is the curve measured by sensor 8 up to a point $P_1$, which here defines crossing of vigilance threshold $L_1$. It is therefore desirable to estimate how much longer bearing 6 may still be used without danger.

It should be noted that the position of $P_1$ at the instant t is only provided as an example. For example, $P_1$ is located at the intersection between the curve and vigilance threshold $L_1$, independent of the moment "t" at which the extrapolation is done.

When bearing 6 reaches danger threshold $L_2$, it may break and lead to damage of mechanical system 1, and thus injury to operators located near mechanical system 1.

In the example of FIG. 4, three curves $C_1$, $C_2$ and $C_3$ extend after point $P_1$ between instant t and a future instant $t_2$, and represent extrapolation of health index IS calculated at step 126 in order to determine the remaining lifetime of bearing 6.

A first scenario is shown by curve $C_1$. In this scenario, curve $C_1$ reaches danger threshold $L_2$ at a future instant $t_1$. A point $P_2'$ represents the breaking point of bearing 6. Thus, the remaining lifetime of bearing 6 at instant t in the first scenario is $V_1$, which is equal to the time difference between instant $t_1$ and instant t.

A second scenario is shown by third curve $C_3$. In this scenario, curve $C_3$ reaches danger threshold $L_2$ at instant $t_2$. A point $P_2''$ represents the breaking point of bearing 6 in this scenario. In this scenario, the remaining lifetime of bearing 6 at instant t is $V_2$, which is equal to the time difference between instant $t_2$ and instant t.

Lastly, a third intermediate scenario is shown by second curve $C_2$. In this scenario, curve $C_2$ reaches danger threshold $L_2$ at a future instant T. A point $P_2$ represents the mean breaking point of bearing 6. Thus, the mean remaining lifetime of bearing 6 at instant t in this scenario is V, which is equal to the time difference between instant T and instant t.

In general, the remaining lifetime of bearing 6 is established by comparing at least one extrapolated future value of health index IS to at least one of the pre-defined limit values.

In all cases, the mean remaining lifetime V of bearing 6 before breaking lies between lifetime $V_1$ of the first scenario and lifetime $V_2$ of the second scenario.

Extrapolation is performed according to a known global localization algorithm, for example, an algorithm of the particle filter type. In a variant, another global localization algorithm may be used, such as a linear regression, or an artificial neural network, or a hidden Markov algorithm, or a Kalman filter, or any other appropriate algorithm.

In general, this extrapolation makes it possible to know in advance when to perform maintenance on mechanical system 1 in order to change bearing 6.

Indeed, a safety interval may be chosen and bearing 6 may be changed when this interval is reached.

For example, a maximum value $IS_{max}$ may be chosen, such that, when the health index of bearing 6 enters an interval, for example 5%, below $IS_{max}$, mechanical system 1 is stopped to be able to change bearing 6. $IS_{max}$ may, for example, be equal to the value of danger threshold $L_2$.

In a variant, a lifetime value $V_{min}$ in the first scenario may be chosen such that when, at extrapolation step 126, lifetime $V_1$ in the first scenario enters an interval, for example 5% below $V_{min}$, mechanical system 1 is stopped to be able to change bearing 6.

Indeed, health index IS is designed so as to be able to follow a statistical distribution of type Chi-2, which makes it possible to associate confidence intervals with the extrapolation and the measurements. This means that if the value of health index IS and/or lifetime $V_1$ is included in an interval of 5% around the extreme values $IS_{max}$ and/or $V_{min}$, the situation is highly abnormal, and therefore dangerous. In general, the confidence interval in which the values of health index IS and lifetime $V_1$ must be found may be chosen by the user as a parameter. For example, the user may choose an interval of 1% in order to have a more precise estimate, or an interval of 10% in order to have a faster calculation.

The method for estimating the wear of rotating machine 2 including bearing 6 described above is implemented periodically. Step 126 for extrapolating the evolution of the value of health index IS of bearing 6 and its lifetime V may also be implemented periodically, and the results may be displayed on communication interface 20 after each calculation.

This method makes it possible to effectively evaluate the health of bearing 6 and to know when to change it in order to avoid any accident, while avoiding changing it too often when it is still functional.

The quasi-linear tendency of the curve of health index IS as a function of time, or in general, at least monotonic, makes this curve easy to analyze, interpret and extrapolate. Thus, the wear of bearing 6 is easily detected.

The embodiment and variants mentioned above may be combined with one another to create new embodiments of the invention.

The invention claimed is:

1. A method for estimating the wear of a rotating machine including at least one bearing, the method comprising:
   measuring vibrations of the rotating machine during its operation, using a vibration sensor;
   automatically extracting, using an electronic detection device, from a signal measured by the vibration sensor, a first signal representative of components of a first frequency range of the measured signal, and a second signal representative of a second frequency range of the measured signal, wherein the first frequency range is the range [10 Hz, 1 kHz] and the second frequency range is the range [10 Hz, 10 kHz];
   calculating, from the first signal, a first data set belonging to a time domain of the first signal;
   extracting first calculation elements from the first data set;
   further calculating, from the second signal, a second data set belonging to a frequency domain of the second signal;
   further extracting second calculation elements from the second data set; and
   determining a health index of the bearing from the first and second calculation elements.

2. The method according to claim 1, wherein the measured signal is an acceleration signal representative of measured vibrations, wherein the first data set comprises a velocity of the measured vibrations, and wherein the second data set comprises an envelope of a spectrum of the acceleration of the measured signal.

3. The method according to claim 1, wherein the first calculation elements comprise at least one element chosen from the following elements: a root mean square of the first data set, and a root mean square of the measured signal, and wherein the second calculation elements comprise at least one root mean square of harmonics of the second data set associated with a predefined failure frequency of the bearing.

4. The method according to claim 1, wherein said determining a health index of the bearing comprises:
   extrapolating the evolution of the health index over time, comprising calculating at least one future value of the health index from at least some previous calculated values of the health index; and
   estimating a remaining lifetime of the bearing by comparing the at least one future value of the health index to at least one pre-defined limit.

5. The method according to claim 4, further comprising emitting an alert via the electronic detection device if the health index exceeds one of the pre-defined limit values.

6. The method according to claim 1, wherein said determining a health index of the bearing comprises calculating a statistical distance relative to a reference data set, for each of the extracted calculating elements.

7. The method according to claim 6, wherein the statistical distance is a distance separating the calculation elements extracted from the reference data set.

8. The method according to claim 6, wherein the statistical distance is a Mahalanobis distance.

9. The method according to claim 1, the method being implemented periodically with a pre-defined periodicity.

10. A mechanical system, comprising:
a rotating machine, comprising:
   a shaft; and
   at least one bearing mounted on said shaft;
a vibration sensor to measure vibrations of said rotating machine; and
an electronic detection device for detecting a defect of said at least one bearing, the electronic detection device being programmed to:
   measure vibrations of said rotating machine during its operation, using said vibration sensor;
   automatically extract, from a signal measured by said vibration sensor, a first signal representative of components of a first frequency range of the measured signal, and a second signal representative of a second frequency range of the measured signal, wherein the first frequency range is the range [10 Hz, 1 kHz] and the second frequency range is the range [10 Hz, 10 kHz];
   calculate, from the first signal, a first data set belonging to a time domain of the first signal;
   extract first calculation elements from the first data set;
   further calculate, from the second signal, a second data set belonging to a frequency domain of the second signal;
   further extract second calculation elements from the second data set; and
   determine a health index of said at least one bearing from each of the first and second calculation elements.

* * * * *